(12) United States Patent
Hearn

(10) Patent No.: US 6,486,704 B1
(45) Date of Patent: Nov. 26, 2002

(54) PROGRAMMABLE BURST FIFO

(75) Inventor: Alan S. Hearn, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/884,584

(22) Filed: Jun. 19, 2001

(51) Int. Cl.[7] .......................................... H03K 19/0175
(52) U.S. Cl. ............................ 326/82; 326/93; 365/233
(58) Field of Search .............................. 326/82, 93, 96, 326/37, 38; 365/221, 233

(56) References Cited

U.S. PATENT DOCUMENTS

| | | | | |
|---|---|---|---|---|
| 5,473,756 A | * | 12/1995 | Traylor | .................. 365/189.12 |
| 5,642,318 A | * | 6/1997 | Knaack et al. | ............... 365/195 |
| 5,892,920 A | * | 4/1999 | Arvidsson et al. | ..... 365/189.01 |
| 6,101,329 A | * | 8/2000 | Graef | ......................... 365/221 |

* cited by examiner

*Primary Examiner*—Don Le
(74) *Attorney, Agent, or Firm*—Pedro P. Hernandez; W. James Brady, III; Frederick J. Telecky, Jr.

(57) ABSTRACT

A programmable burst FIFO buffer (100) allows for burst of data to be loaded into memory (106) without the device writing into the buffer having to check on every clock cycle as to whether the buffer is full or not. The buffer (100) is also programmable and allows for "N" words to be loaded with "N" being programmable in any given burst without having to check for a buffer full condition. The buffer (100) also avoids the glitches associated with other buffer designs due to the write and read clock being in different domains.

11 Claims, 4 Drawing Sheets

| SIGNAL NAME | I/O | F/T | BLOCK SIGNAL DESCRIPTION |
|---|---|---|---|
| ARSTZ_MQ | I | SSF | SYSTEM RESET - FOR CLK_M REGISTERS |
| CLK_M | I | SSF | MEMORY BUS CLOCK |
| ARSTZ_CQ | I | SSF | SYSTEM RESET - FOR CLK_C REGISTERS |
| CLK_C | I | SSF | COMB CLOCK |
| PBC_BRSIZE_AQ(4:0) | I | FPBC | BURST READ SIZE |
| PBC_XSIZE_AQ(2:0) | I | FPBC | TRANSFER SIZE |
| CMB_UNLOAD_CQ | I | CMB | FRB FIFO UNLOAD CONTROL |
| FMC_DATARDY_M | I | FMC | MEMORY DATA READY |
| FMC_DATA_MQ(127:0) | I | FMC | MEMORY DATA |
| FMC_FRBCLR_MQ | I | FMC | FIFO CLEAR |
| FMC_BRSIZE_MQ(6:0) | I | FMC | CURRENT BURST READ SIZE |
| FMC_BRDY_M | O | FMC | FIFO READY FOR MEMORY DATA BURST |
| FRB_EMPTY_C | O | CMB | FIFO EMPTY |
| FRB_CMBDATA_CQ(127:0) | O | CMB | FIFO COMB DATA |
| FRB_CLR_CQ | O | CMB | FRB CLEAR (SEQUENCE ABORT) |
| FRB_OVF_CQ | O | FPBC | FIFO OVERFLOW |
| FRB_TESTMUX_U(30) | O | FTM | TEST MUX OUTPUT |

*FIG. 2*

| PBC_BRSIZE_AQ(4:0) | BURST READ SIZE |
|---|---|
| 0000X | 4 |
| 00010 | 6 |
| 00011 | 8 |
| ⋮ | ⋮ |
| 11101 | 60 |
| 11110 | 62 |
| 11111 | 64 |

*FIG. 5*

PROGRAMMABLE BURST FIFO

TECHNICAL FIELD

This invention relates in general to the field of electronics and more particularly to a programmable burst FIFO buffer.

BACKGROUND

Typical first-in-first-out (FIFO) devices such as FIFO buffers allow only one word to be stored at a time, with the device or system that the FIFO is being used with having to check that the, FIFO is not full after each subsequent word is loaded. This limitation presents problems for systems using interfaces such as RAMBUS that need to have multiple words or bursts of data loaded at any given point in time.

Current FIFO designs have to be conservative as to when to trigger the full or empty flags because the flags may glitch. In order to be conservative some current FIFO buffer designs report full or empty buffers when it is not necessarily the case in order to protect against overflows or underflows when writing to the buffer. Glitches can occur due to the write and read sides being in different clock domains. A need thus exists for a FIFO device that can alleviate some of the problems mentioned above.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

FIG. 2 shows a table listing the different inputs/outputs (I/Os) of the buffer of FIG. 1.

FIG. 5 shows a table of the different burst read sizes available for the buffer of FIG. 1 in accordance with the preferred embodiment.

DETAILED DESCRIPTION OF THE PREFERRED EMBODIMENT

Figure 1:
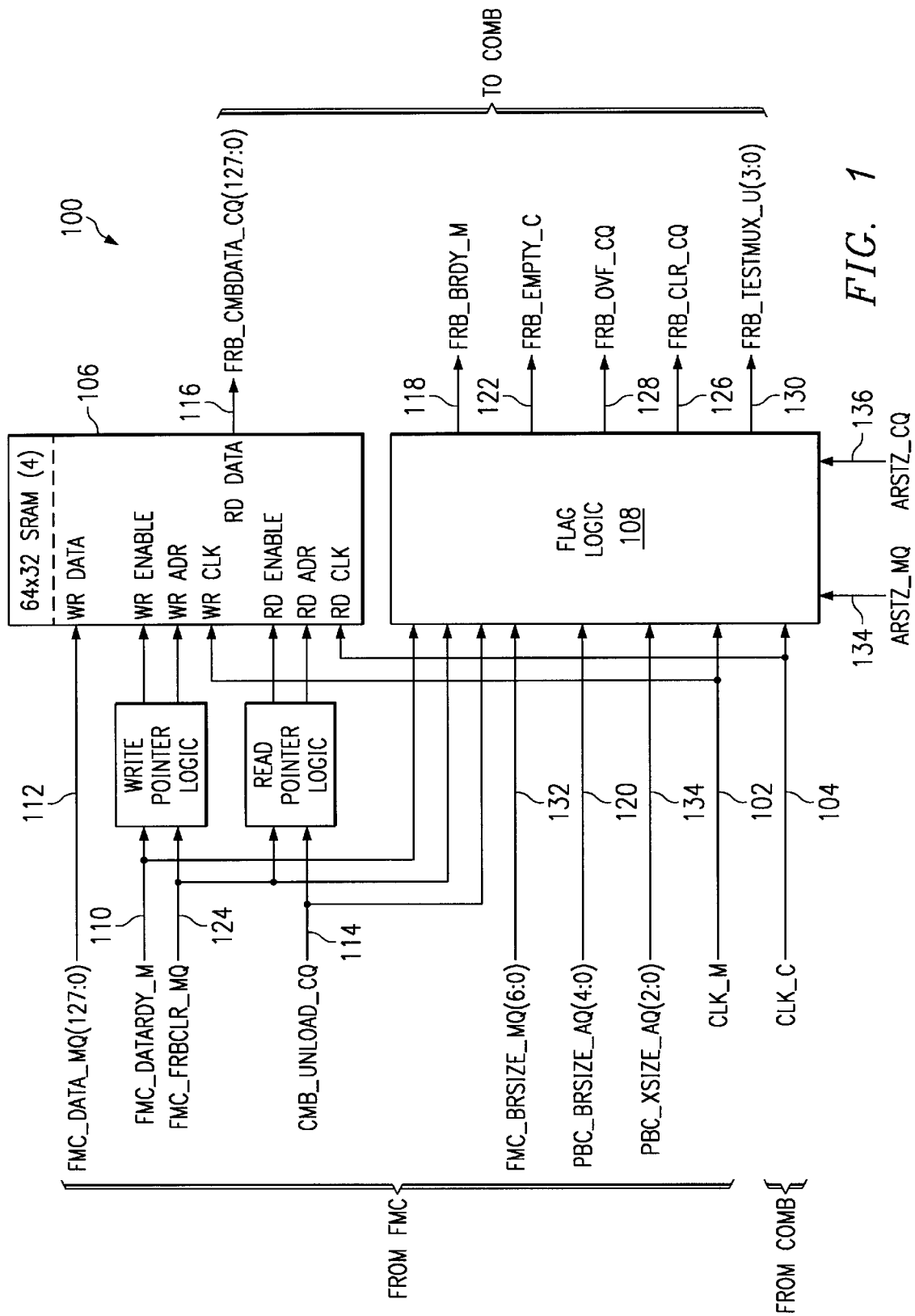
FIG. 1 shows a block diagram of a frame read buffer in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is shown a block diagram of a frame read buffer (FRB) 100 which is a FIFO buffer that buffers RAMBUS channel read data for subsequent read by another device. In the preferred embodiment, FIFO buffer is part of a data processor, such as a Texas Instruments DDP1000 DMD data processor. In this embodiment, writes into the buffer 100 are performed by a frame memory controller (FMC) and reads from the buffer are performed by a Comb circuit that is also part of the data processor. It should be noted that the buffer 100 of the present invention can be used in any situation where a FIFO buffer is needed and is not limited to the use in a data processor as described herein.

FIFO buffer 100 is an asynchronous FIFO buffer with writes into the buffer based on a clock signal (CLK_M) 102 and reads from the buffer based on clock signal (CLK_C) 104. The FIFO buffer 100 includes a 64 word memory with each word containing 128 bits (pixels), and is preferably implemented using four 64×32 static random access memories (SRAMs) 106. Although the preferred embodiment uses four memories any other memory arrangement can be used.

Figure 3:
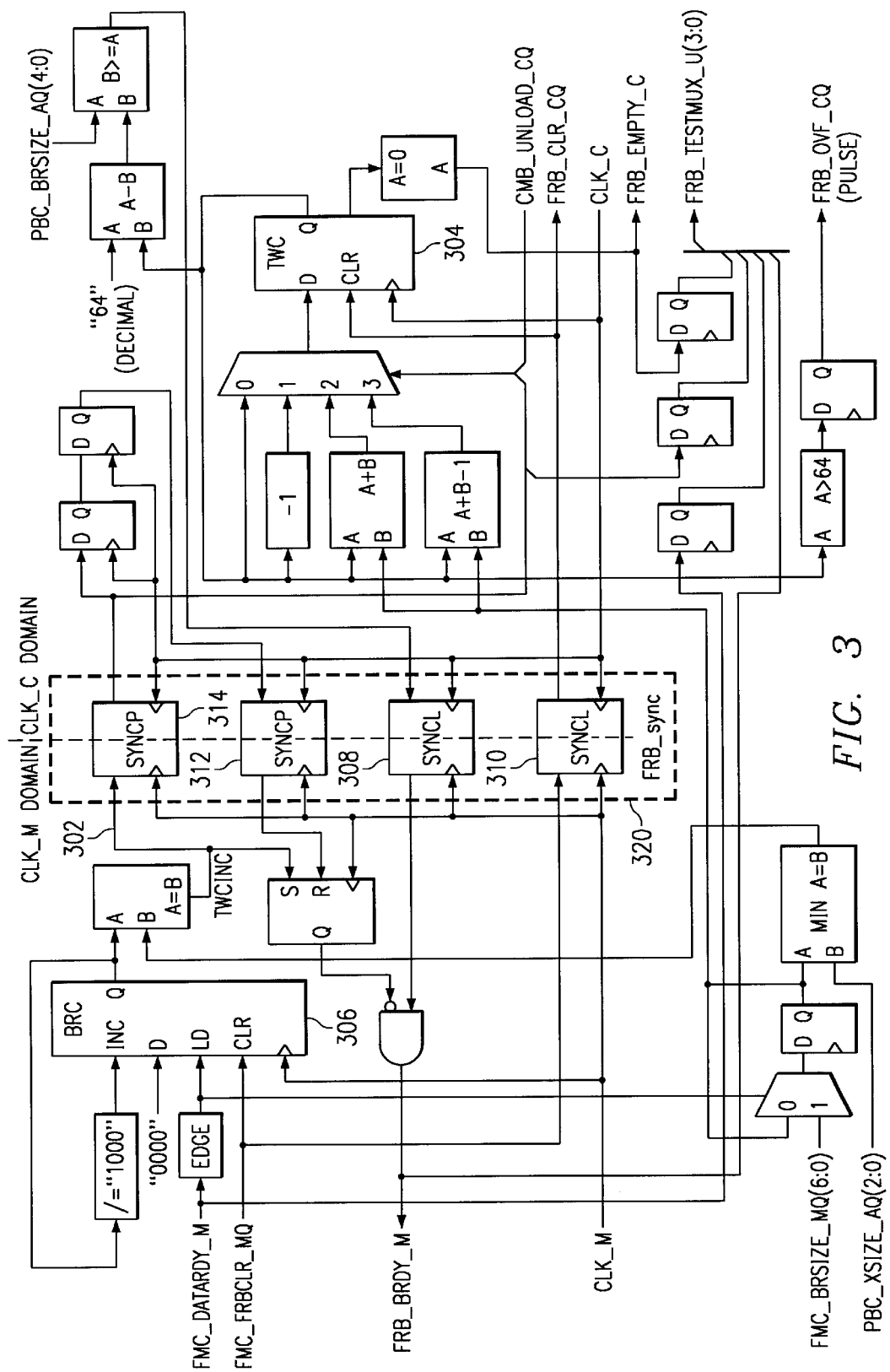
FIG. 3 shows a more detailed diagram of the Flag logic block shown in FIG. 1.
Figure 4:
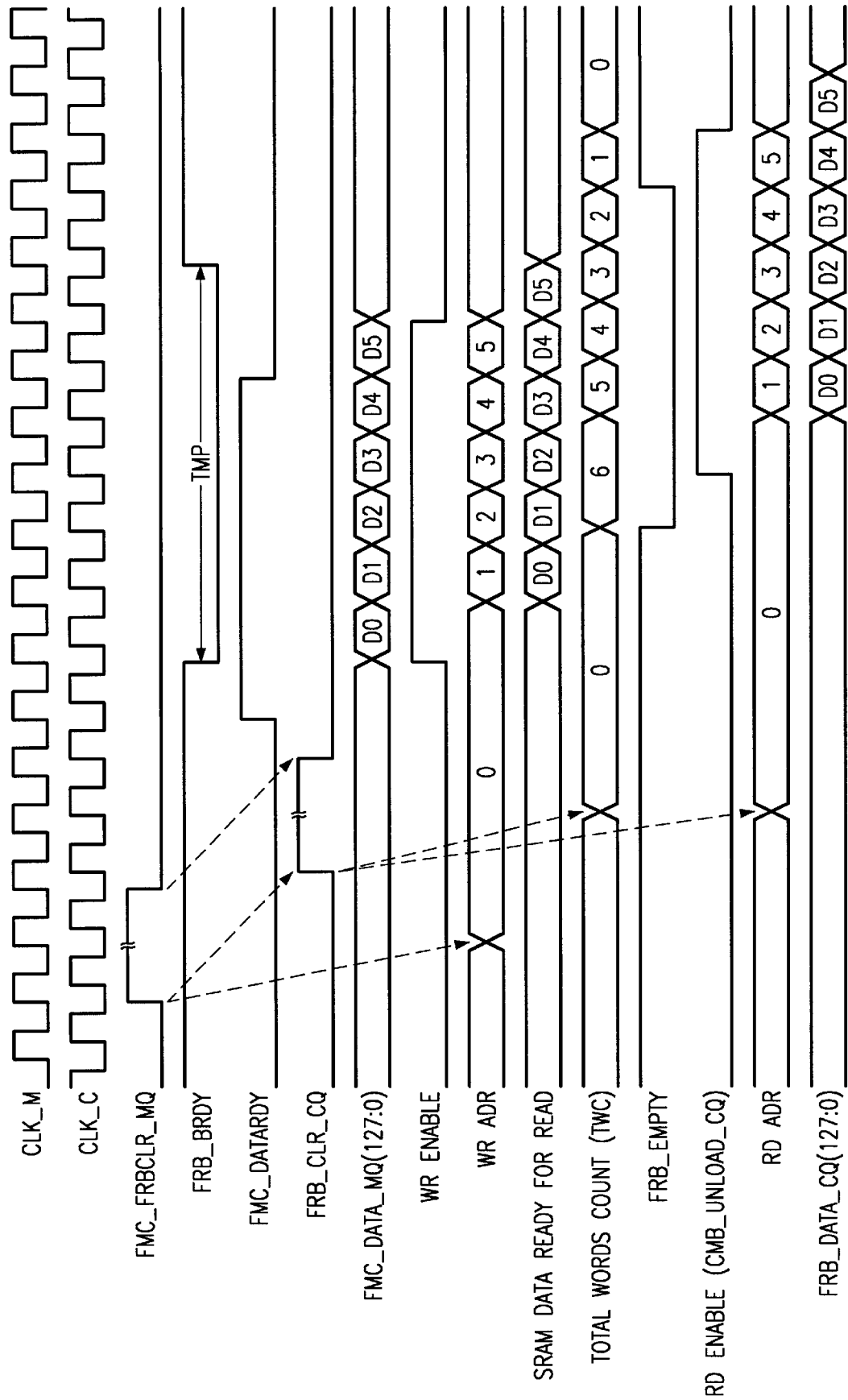
FIG. 4 shows an interface-timing diagram for the buffer of FIG. 1.

The different inputs labeled as "I", and outputs labeled as "O", for the FIFO buffer 100 are shown are shown and described in the table in FIG. 2. While a more detailed block diagram of the flag logic block 108 is shown in FIG. 3.

For FIFO write (RAMBUS channel read) operations, the memory data ready input signal FMC_DATARDY_M 110 indicates new data from the channel will be on the memory data lines FMC_DATA_MQ 112 on the next clock. The FRB 100 uses the FMC_DATARDY_M input signal 110 to increment the address pointer and generate a write enable to the SRAM 106. Write operations to the FRB 100 are performed in the CLK_M domain.

For FIFO read operations, also referred to as a COMB write in the preferred embodiment since the reads are sent to a Comb device not shown, the input signal CMB_UNLOAD_CQ 114 indicates that the current data on the FRB_CMBDATA_MQ output lines 116 has been accepted by the Comb. This input signal 114 causes the read address pointer to increment. FIFO read operations are in the CLK_C domain.

The output signal FRB_BRDY_M 118, when asserted indicates to the FMC that the FIFO 100 has enough room to accept a full burst read from the channel. The flag logic 108 compares the input signal PBC_BRSIZE_AQ 120 to the amount of memory left in the FIFO to set or reset the output signal FRB_BRDY_M 118. This signal is synchronized to CLK_M.

The output signal FRB_EMPTY_C 122, when asserted indicates to the Comb that no data is available for reading into the Comb's array. This signal is synchronized to CLK_C 104. The input signal FMC_FRBCLR_MQ 124, when asserted synchronously resets the read and write address pointers as well as the output flags. It is set due to an abort condition from the sequencer and causes all current FIFO data to be lost. It is synchronized to the CLK—C 106 domain to clear the total words counter (TWC 304 shown in FIG. 3). It is also output to the Comb as output signal FRB_CLR_CQ 126. The input signal FMC_FRBCLR_MQ 124 from the FMC is held asserted after a sequence abort until the next new burst read request is requested. The FRB_CLR_CQ signal 126 mirrors this behavior in the CLK_C domain. The output signal FRB_OVF_CQ 128 is set if the FRB 100 overflows. This is an error condition and is used to cause an interrupt in the DDP1000.

The occurrence of this condition indicates that the hardware is broken and the FMC has attempted to load more words than are available into the FRB 100. The output signal FRB_TESTMUX_U 130 connects the following four signals to FMT_TESTMUX_U and subsequently to the test output pins of the DDP 1000 (data processor which the FRB 100 is a part of in the preferred embodiment) when PBC_TMSEL_AQ is set to "010XXX":

FRB_CMBUNLOAD_CQ (locally registered version of CMB_UNLOAD_CQ);

FRB_DATARDY_MQ (locally registered version of FMC_DATARDY_MQ);

FRB_BRDY_M; and

FRB_EMPTY_CQ.

The interconnection of these four signals into the output signal FRB_TEXTMUX_U 130 is shown in FIG. 3.

The flag logic block 108 is designed to allow the two clock signals (CLK_M and CLK_C) 102, 104 to be completely asynchronous to each other. The CLK_C (read) domain has a total words counter (TWC, 304 in FIG. 3) which keeps track of the number of words available for read operations. For each burst write operation into the FRB 100, a signal (TWCINC) 302 (see FIG. 3) is sent from the CLK_M domain to the CLK_C domain to increase the value of this counter by the size of the value in the input signal FMC_BRSIZE_MQ 132. FMC_BRSIZE_MQ is equal to the size of the current burst operation. It is always equal to the value of PBC_BRSIZE_AQ 120 except for the final burst of a fetch bit plane sequence when it is equal to the remaining number of words to be transferred. Signal TWCINC 302 also disables the output signal FRB_BRDY_M 118 until a feedback signal from the CLK_C domain indicates that the comparison of the newly adjusted TWC 304 to the total words available has been made. This "wrap around" signal allows the clock domains to run at any speed since the FRB_BRDY_M signal 118 always waits for the effect of adjusting the TWC 304 before allowing it to be asserted.

The TWCINC signal 302 is asserted when the burst counter (BRC) 306 is equal to the minimum of the value of the PBC_XSIZE_AQ signal 120 and the value of FMC_BRSIZE_MQ signal 132. The setting of the PBC_XSIZE_AQ input signal 134 is based on the write rate versus the read rate. If the read rate is equal to or slower than the write rate, this value should be set to zero. This allows the Comb reads to begin as soon as the first data is available in the BRC 306. For faster read rates, it must be determined how many words need to be written before reads can begin without the FIFO being emptied. The one performance penalty is that at the completion of a burst read (FIFO write) the FRB 100 will always de-assert the FRB_BRDY_M 118 even if there is room in the FIFO. However, this is not significant, as the FMC never allows back-to-back burst read operations. The FRB_EMPTY_C signal 122 is simply a zero detect on the TWC, indicating that no more words are available for a read operation by the Comb.

The TWCINC signal 302 and the "wrap around" signals use pulse type synchronizers (SYNCP) 312, 314. The synchronizer (SYNCL) 308 feeding the FRB_BRDY_M output signal and the synchronizer 310 feeding the FRB_CLR_CQ output signal are both level synchronizers. All synchronizers are combined into a single block of hierarchy called FRB_SYNC 320 as shown in FIG. 3.

The PBC_BRSIZE_AQ input signal 120 indicates the size of the burst reads (FIFO writes) by the FMC. The actual burst read size is equal to [PBC_BRSIZE_AQ+1)*2] except for the case when the value of the PBC_BRSIZE_AQ The FIFO buffer (100) of the present invention provides for improved performance by allowing bursts of data to be loaded without having to check the empty/full flag on every clock cycle as some prior art FIFOs. The buffer (100) also avoids glitches found in some prior art designs.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. The present invention provides for an easy and cost effective way of potential buyers of electronic devices/systems to evaluate a part over the Internet. In this way a potential customer can save the time and expense of buying and using an evaluation board to test a part he/she is considering to purchase.

What is claimed is:

1. A programmable first-in-first-out (FIFO) buffer, comprising:
    an input port for receiving data into the FIFO buffer;
    an output port for providing data from the FIFO buffer;
    a first clock signal provided by a circuit that provides the data to the FIFO buffer;
    a second clock signal provided by a circuit that receives the data from the FIFO buffer;
    a memory storage area coupled to the input and output ports;
    a flag logic block coupled to the first and second clock signals, the flag logic block allows the first and second clock signals to be asynchronous to each other; and
    a total word counter coupled to the second clock signal, the total word counter keeps track of the number of words that can be written into the memory storage area.

2. A programmable FIFO buffer as defined in claim 1, wherein the flag logic block comprises a plurality of synchronizers.

3. A programmable FIFO buffer as defined in claim 2, wherein the first and second clock signals are coupled to each of the plurality of synchronizers.

4. A programmable FIFO buffer as defined in 1, further comprising:
    circuitry coupled to the total word counter which can programmed to control the amount of data that can be loaded via the input port into the memory storage area in one burst.

5. A programmable first-in-first-out (FIFO) buffer, comprising:
    an input port for receiving data into the FIFO buffer;
    an output port for providing data from the FIFO buffer;
    a first clock signal provided by a circuit that provides the data to the FIFO buffer;
    a second clock signal provided by a circuit that receives the data from the FIFO buffer;
    a memory storage area coupled to the input and output ports; and
    a flag logic block coupled to the first and second clock signals, the flag logic block allows "N" data to be loaded into the memory storage area without the circuit that provides the data to the FIFO buffer having to check that the memory storage area can not accept any more data.

6. A programmable FIFO buffer as defined in claim 5, wherein the flag logic block comprises a plurality of synchronizers.

7. A programmable FIFO buffer as defined in claim 5, wherein the flag logic block can be programmed to change the amount of data, "N", that can be loaded into the memory storage area without the circuit that provides the data to the FIFO buffer having to check that the memory storage area can not accept any more data.

8. A programmable FIFO buffer as defined in claim 5, wherein the flag logic block allows the first and second clock signals to be asynchronous to each other.

9. A programmable FIFO buffer as defined in claim 6, wherein the first and second clock signals are coupled to each of the plurality of synchronizers.

10. A programmable FIFO buffer as defined in claim 9, further comprising:

a total word counter coupled to the second clock signal, the total word counter keeps track of the number of words, "N", that can be written into the memory storage area.

11. A programmable FIFO buffer as defined in 10, further comprising:

circuitry coupled to the total word counter which can programmed to control the amount of data that can be loaded via the input port into the memory storage area in one burst.

* * * * *